US007573664B2

(12) United States Patent
Bentley et al.

(10) Patent No.: US 7,573,664 B2
(45) Date of Patent: Aug. 11, 2009

(54) INTEGRATED MULTIPLE CHANNEL DATA RELIABILITY TESTING FOR A MAGNETIC TAPE DRIVE

(75) Inventors: Steven Ross Bentley, Tucson, AZ (US); Robert Allen Hutchins, Tucson, AZ (US); Demura Masayuki, Kanagawa (JP); Shuhei Nadehara, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 193 days.

(21) Appl. No.: 11/003,224

(22) Filed: Dec. 3, 2004

(65) Prior Publication Data
US 2006/0119962 A1 Jun. 8, 2006

(51) Int. Cl.
*G11B 27/36* (2006.01)
(52) U.S. Cl. .............................. 360/31; 360/48; 360/51; 360/53; 360/75; 360/77.12
(58) Field of Classification Search .................. 360/31, 360/51, 53, 77.12, 75, 78.02
See application file for complete search history.

(56) References Cited

U.S. PATENT DOCUMENTS

| 4,142,215 | A | | 2/1979 | Roberts ........................ 360/31 |
| 4,432,652 | A | * | 2/1984 | Munekata et al. ............. 368/69 |
| 4,558,380 | A | * | 12/1985 | Porter .......................... 360/53 |
| 4,791,643 | A | * | 12/1988 | Molstad et al. .............. 714/762 |
| 5,287,478 | A | | 2/1994 | Johnston et al. ............. 395/425 |
| 5,333,140 | A | * | 7/1994 | Moraru et al. ............... 714/719 |
| 5,357,380 | A | * | 10/1994 | Bailey et al. .................. 360/51 |
| 5,367,410 | A | * | 11/1994 | McCarthy ..................... 360/48 |
| 5,408,366 | A | * | 4/1995 | Bentley et al. ................. 360/53 |
| 5,448,430 | A | * | 9/1995 | Bailey et al. ............. 360/77.12 |
| 5,499,147 | A | * | 3/1996 | Tsai et al. ..................... 360/53 |
| 5,930,065 | A | * | 7/1999 | Albrecht et al. ............. 360/72.2 |
| 5,943,180 | A | * | 8/1999 | Seo et al. .................. 360/77.12 |
| 5,955,306 | A | * | 9/1999 | Gimeno et al. .............. 435/69.1 |
| 5,982,711 | A | * | 11/1999 | Knowles et al. ........... 360/77.12 |
| 5,995,306 | A | * | 11/1999 | Contreras et al. .............. 360/31 |
| 5,999,354 | A | * | 12/1999 | Shitara ........................ 360/53 |
| 6,031,673 | A | * | 2/2000 | Fasen et al. ................... 360/53 |
| 6,128,147 | A | * | 10/2000 | Ebata et al. ................... 360/53 |
| 6,134,070 | A | * | 10/2000 | Tran et al. ..................... 360/75 |
| 6,169,640 | B1 | * | 1/2001 | Fasen .......................... 360/48 |
| 6,330,123 | B1 | * | 12/2001 | Schwarz et al. ............... 360/75 |

(Continued)

OTHER PUBLICATIONS

Weiss, Equipment Tester, Aug. 1971, IBM Technical Disclosure Bulletin, Aug. 1971, US vol. 14, Issue 3, pp. 722-723.*

(Continued)

*Primary Examiner*—Hoa T Nguyen
*Assistant Examiner*—Dismery E Mercedes
(74) *Attorney, Agent, or Firm*—John H. Holcombe

(57) ABSTRACT

Data reliability testing for a magnetic tape drive is conducted separately for the channels of a magnetic tape drive which write and read tracks of a multiple track magnetic tape. Memory stores testing data representing data separately written to tracks of a multiple track magnetic tape; each of a plurality of read channels reads data sensed by a tape head from a separate track of a magnetic tape; and error processing logic detects differences between data from each of a plurality of the read channels, and stored testing data of the memory representing data written to the same separate tracks.

2 Claims, 8 Drawing Sheets

U.S. PATENT DOCUMENTS

| | | | | |
|---|---|---|---|---|
| 6,462,899 | B1* | 10/2002 | Chliwnyj et al. | 360/77.12 |
| 6,631,492 | B2* | 10/2003 | Marchant | 714/764 |
| 6,639,753 | B1* | 10/2003 | Henze et al. | 360/121 |
| 6,646,830 | B2* | 11/2003 | Biskeborn et al. | 360/129 |
| 6,671,111 | B2 | 12/2003 | Ottesen et al. | 360/31 |
| 6,744,581 | B2* | 6/2004 | Miyamura | 360/53 |
| 6,826,140 | B2* | 11/2004 | Brommer et al. | 369/94 |
| 7,055,081 | B2* | 5/2006 | Boyer et al. | 714/764 |
| 2002/0006004 | A1* | 1/2002 | Miyamura | 360/53 |
| 2004/0078185 | A1 | 4/2004 | Briggs et al. | 703/24 |
| 2004/0168024 | A1* | 8/2004 | Buckingham | 711/111 |
| 2005/0168865 | A1* | 8/2005 | Simmons et al. | 360/77.12 |

OTHER PUBLICATIONS

NN7108722, Equipment Tester, IBM Technical Disclosure Bulletin, Aug. 1, 1971, vol. No. 14, Issue No. 3, p. 722-723.*

NN108722, Equipment Tester, IBM Technical Disclosure, Aug. 1, 1971, vol. No. 14, Issue No. 3, p. 722-723.*

NM 108722, Equipment Tester, IBM Technical Disclosure, Aug. 1, 1971, vol. No. 14, Issue No. 3, p. 722-723.*

* cited by examiner

INTEGRATED MULTIPLE CHANNEL DATA RELIABILITY TESTING FOR A MAGNETIC TAPE DRIVE

FIELD OF THE INVENTION

This invention relates to magnetic tape drives, and, more particularly, to data reliability testing of tape drives which are capable of writing to a multiple track magnetic tape.

BACKGROUND OF THE INVENTION

Magnetic tape drives provide a means of storing data on magnetic tape cartridges to be saved and read back at a subsequent time, typically as groups of parallel tracks, where data is recorded as data records or the equivalent, on the groups of parallel tracks. Magnetic tape cartridges may be interchanged between magnetic tape drives, such that data may be written by one magnetic tape drive and subsequently read back by a different magnetic tape drive. Data reliability therefore is an important aspect of magnetic tape drives.

Data reliability testing for magnetic tape drives typically comprises stand-alone devices that attach to a tape drive prototype, test-stand, or plate model. Such test systems are produced in limited quantities, require custom hardware, and require custom interface software.

Further, such test systems work with respect to the external interface(s) of the magnetic tape drive and provide test data to be recorded and read back as complete data records as a whole, covering all of the parallel tracks of a group, as in the normal functioning of a multi-track magnetic tape drive.

SUMMARY OF THE INVENTION

Apparatus for data reliability testing for one or more magnetic tape drives, recording channels, data reliability testing systems, and methods for testing the data reliability of a magnetic tape drive are provided. The testing is conducted separately for the channels of a magnetic tape drive for writing and reading separate tracks of a multiple track magnetic tape.

In one embodiment, memory stores testing data representing data separately written to tracks of a multiple track magnetic tape; each of a plurality of read channels reads data sensed by a tape head from a separate track of a magnetic tape; and error processing logic detects differences between data from each of a plurality of the read channels, and stored testing data of the memory representing data written to the same separate tracks.

In a further embodiment, the read channels strip format information from the data sensed by the tape head.

In another embodiment a control is provided to organize the data for comparison to detect the differences. In a further embodiment, the control may comprise a state machine.

In another embodiment, a plurality of write channels each supplies data to a tape head for separately writing data to a track of a multiple track magnetic tape; memory stores testing data representing testing data separately written to tracks of a magnetic tape by the plurality of write channels; a plurality of read channels, each reads data sensed by a tape head from a separate track of a magnetic tape; and error processing logic detects differences between data from each of a plurality of the read channels, and stored data of the memory representing data written to the same separate tracks.

In a further embodiment, a write data buffer arranges the testing data for separately writing the data to the tracks.

In a still further embodiment, a controller supplies testing data for writing the testing data to the separate tracks and supplies the testing data for storing by the memory.

In a further embodiment, the write channels additionally comprise write logic to add format information to the testing data. In another embodiment, the read channels strip format information from the data sensed by the tape head.

In one embodiment, a data reliability testing system tests at least one magnetic tape drive, and comprises an error control system and integrated elements of a magnetic tape drive. The integrated elements comprise a memory for storing testing data supplied by the error control system, the testing data representing data separately written to tracks of a multiple track magnetic tape; a plurality of read channels, each for reading data sensed by a tape head from a separate track of a magnetic tape; and error processing logic for detecting differences between data from each of a plurality of the read channels, and stored testing data of the memory representing data written to the same separate tracks, and providing error information regarding the detected differences for the error control system.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
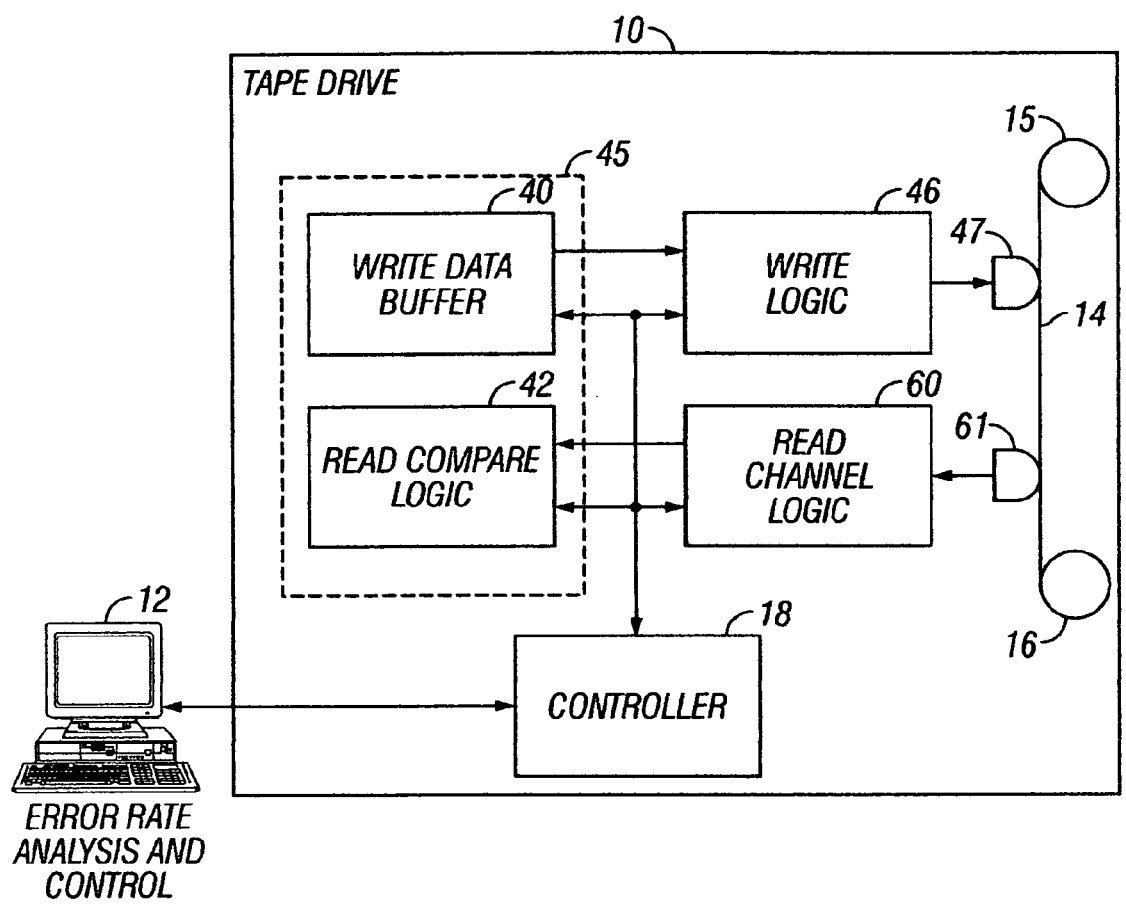
FIG. 1 is a block diagram of an embodiment of a data reliability testing system in accordance with the present invention.

Referring to FIG. 1, an embodiment of a data reliability testing system comprises a magnetic tape drive 10, and optionally comprises an error control system 12 which may comprise a processor or other element configured to initiate data reliability testing of at least one magnetic tape drive, and additionally may be configured to analyze provided error information. Data reliability testing for a magnetic tape drive is conducted separately for the channels of a magnetic tape drive which write and read tracks of a multiple track magnetic tape. Initiation of testing may additionally comprise providing the testing data to the magnetic tape drive 10. The error control system 12 may comprise any suitable processor or set of processors.

Figure 2:
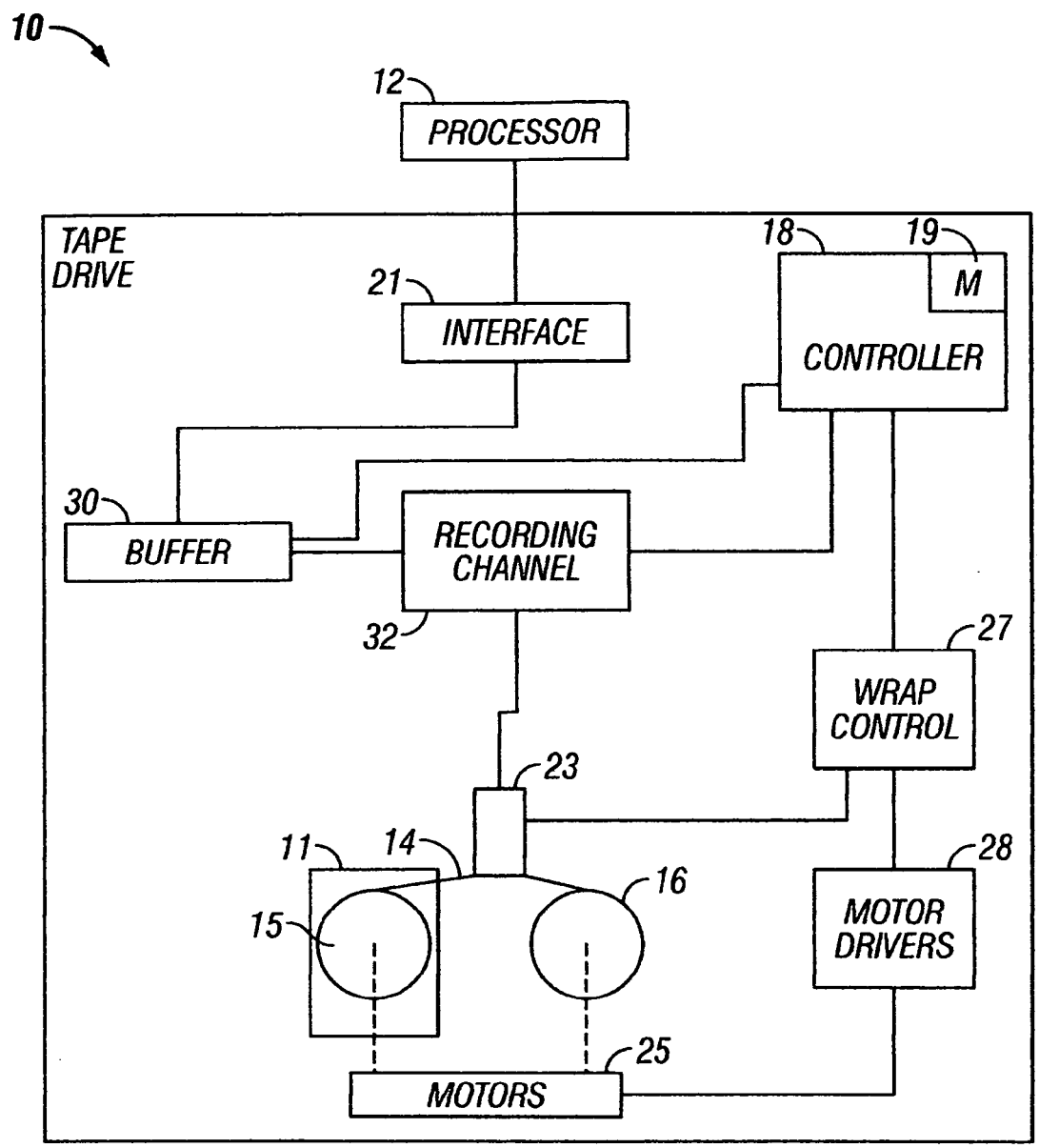
FIG. 2 is a block diagram of an embodiment of a magnetic tape drive which may implement an embodiment of the present invention.

FIG. 2 illustrates an embodiment of the magnetic tape drive 10 of FIG. 1 which may implement aspects of the present invention. The magnetic tape drive provides a means for reading and writing information with respect to a magnetic tape 14 of a magnetic tape cartridge 11.

Magnetic tape cartridges provide a means to store data on magnetic tape to be saved and read at a subsequent time. Further, the magnetic tape cartridges may be interchanged between tape drives, such that a magnetic tape written on one tape drive will be read by another tape drive.

As is understood by those of skill in the art, a magnetic tape cartridge 11 comprises a length of magnetic tape 14 wound on one or two reels 15, 16.

A single reel magnetic tape cartridge 11 is illustrated, examples of which are those adhering to the Linear Tape Open (LTO) format. An example of a magnetic tape drive 10 is the IBM 3580 Ultrium magnetic tape drive based on LTO technology. A further example of a single reel magnetic tape drive and associated cartridge is the IBM 3592 TotalStorage Enterprise magnetic tape drive and associated magnetic tape cartridge. An example of a dual reel cartridge is the IBM 3570 magnetic tape cartridge and associated drive.

Also as is understood by those of skill in the art, a magnetic tape drive 10 comprises one or more controllers 18 of a recording system for operating the magnetic tape drive in accordance with commands received from error control system 12 received at an interface 21. A controller typically comprises logic and/or one or more processors with a memory 19 for storing information and program information for operating the controller(s). The program information may be supplied to the memory via the interface 21, by an input to the controller 18 such as a floppy or optical disk, or by read from a magnetic tape cartridge, or by any other suitable means. The magnetic tape drive 10 may comprise a standalone unit or comprise a part of a tape library or other subsystem. The magnetic tape drive 10 may be coupled to the error control system 12 directly, through a library, or over a network, and employ at interface 21 a Small Computer Systems Interface (SCSI), an optical fiber channel interface, a serial MP (micro-processor) port, etc.

The magnetic tape cartridge 11 may be inserted in the magnetic tape drive 10, and loaded by the magnetic tape drive so that one or more read and write heads 23 of the recording system read and/or write information in the form of signals with respect to the magnetic tape 14 as the tape is moved longitudinally by one or more motors 25 which rotate the reels 15, 16. The magnetic tape typically comprises a plurality of parallel tracks, typically arranged as groups of tracks. In some formats, such as the LTO format, above, the tracks are arranged in a serpentine back and forth pattern of separate wraps, as is known to those of skill in the art. Also as known to those of skill in the art, the recording system may comprise a wrap control system 27 to electronically switch to another set of read and/or write heads, and/or to seek and move the read and write heads 23 laterally of the magnetic tape, to position the heads at a desired wrap or wraps, and, in some embodiments, to track follow the desired wrap or wraps. The wrap control system may also control the operation of the motors 25 through motor drivers 28, both in response to instructions by the controller 18. A wrap may be considered as a group of tracks.

Controller 18 also provides the data flow and formatting for data to be read from and written to the magnetic tape, employing a buffer 30 and a recording channel 32, as is known to those of skill in the art.

The drive system comprises at least motors 25 and reels 15, 16, and moves a magnetic tape 14 with respect to the write and read heads 23 such that the write heads may write signals on the magnetic tape, and read heads may sense magnetic signals on the magnetic tape, as arranged by the recording channel 32.

The testing data may comprise any suitable pattern capable of being written on a magnetic tape 14, sensed by the magnetic tape head, and detected by the recording channel 32, as is understood by those of skill in the art.

Referring to FIG. 1, in one embodiment, the testing data is supplied by the error control system 12 when the error control system initiates the data reliability testing of at least one magnetic tape drive, such as magnetic tape drive 10. For example, in one embodiment, a group of magnetic tape drives may be provided, such as in a tape drive manufacturing or testing facility, connected to the error control system. The error control system may supply the same testing data to all of the connected magnetic tape drives. Alternatively, a remote or local test may be initiated by an error control system 12 of a single magnetic tape drive 10, or to all or some of the magnetic tape drives of an installation, such as of a library. Still alternatively, the testing data may be preloaded to the magnetic tape drive, e.g. by an error control system.

In the embodiment of FIG. 1, the controller 18 directs the testing data to a write data buffer 40 and to read compare logic 42. The write data buffer 40 and read compare logic 42 may comprise specialized logic and memory arrangements, or may comprise specialized usage of pre-existing components of the magnetic tape drive. The write data buffer 40 the read compare logic 42 may comprise any suitable arrangement for storing and processing data.

Figure 3:
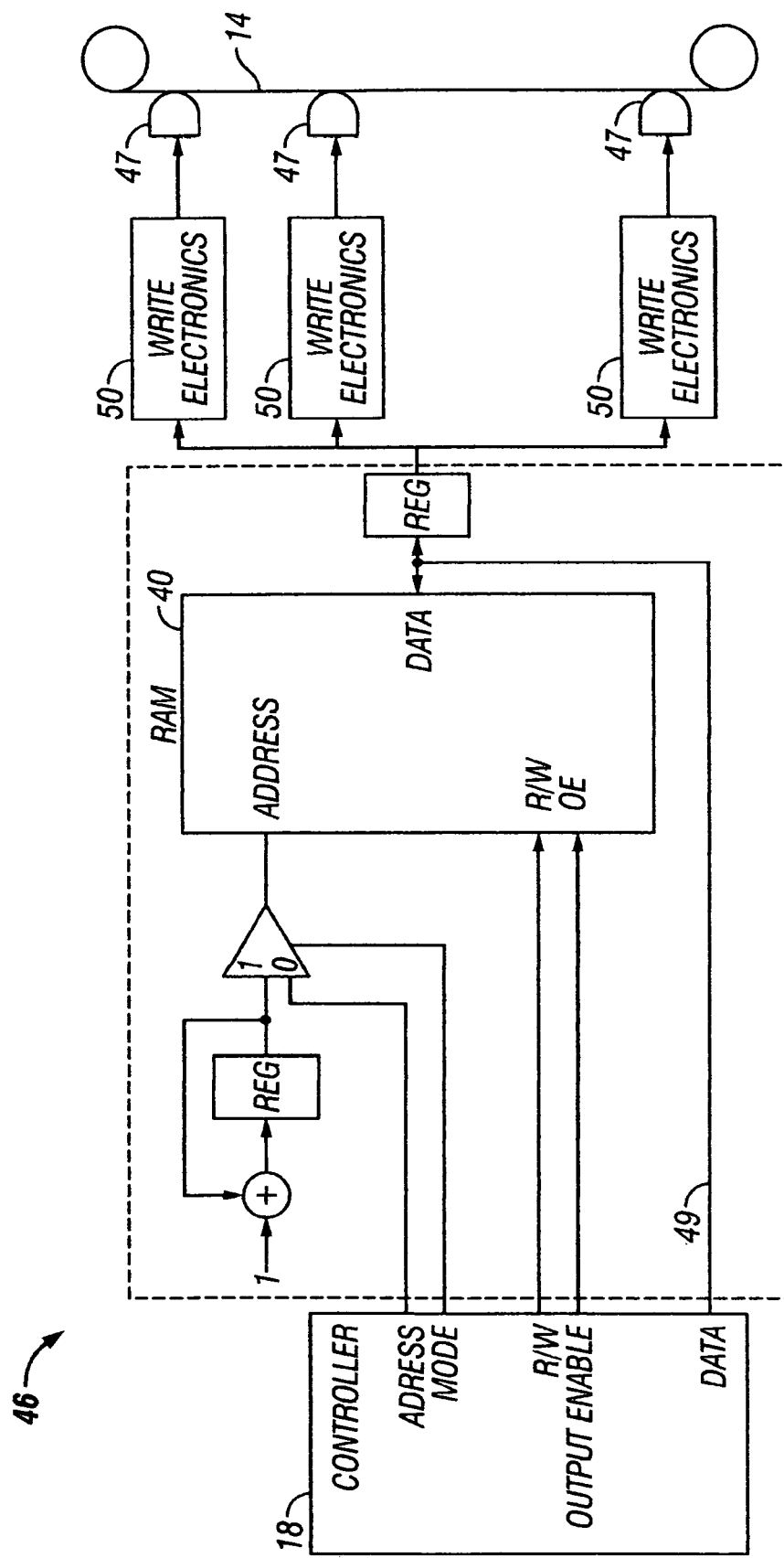
FIG. 3 is a block diagram of write logic of the magnetic tape drive of FIG. 2.

In one embodiment, referring to FIGS. 1 and 3, the testing data comprises a pattern load provided by the error control system 12, and is separate for each track of a group to be recorded, as written by write logic 46 and write heads 47. Write heads 47 comprise the write heads of write and read heads 23 of FIG. 2. Still referring to FIGS. 1 and 3, in the embodiment of FIG. 3, the data 49 is supplied from controller 18 to a random access buffer 40 and gated out to the write electronics 50 for separately writing to tracks of the magnetic tape 14. As discussed above, the tracks of the magnetic tape 14 are typically arranged in groups. The data reliability testing may be conducted for a single one of the groups of tracks, or, alternatively, more or all of the groups of tracks may be written, read back and tested.

Still referring to FIGS. 1 and 3, the pattern may be unique for each track, or, alternatively, the same patterns may be used for some or all of the tracks. For example, pairs of tracks in a group may have the same pattern recorded by the write heads 47.

In an alternative embodiment, partial patterns may be provided, and the partial patterns are repeatedly written to the tracks of the magnetic tape.

In one embodiment, the separate data may be supplied simultaneously to each of the write heads 47. Alternatively, the separate data may be supplied to each of the write heads 47 in a sequence.

Thus, testing data is separately written to tracks of a multiple track magnetic tape 14, and the testing data is stored in a memory of the read compare logic 42, the stored data representing testing data separately written to tracks of the magnetic tape.

Figure 4:
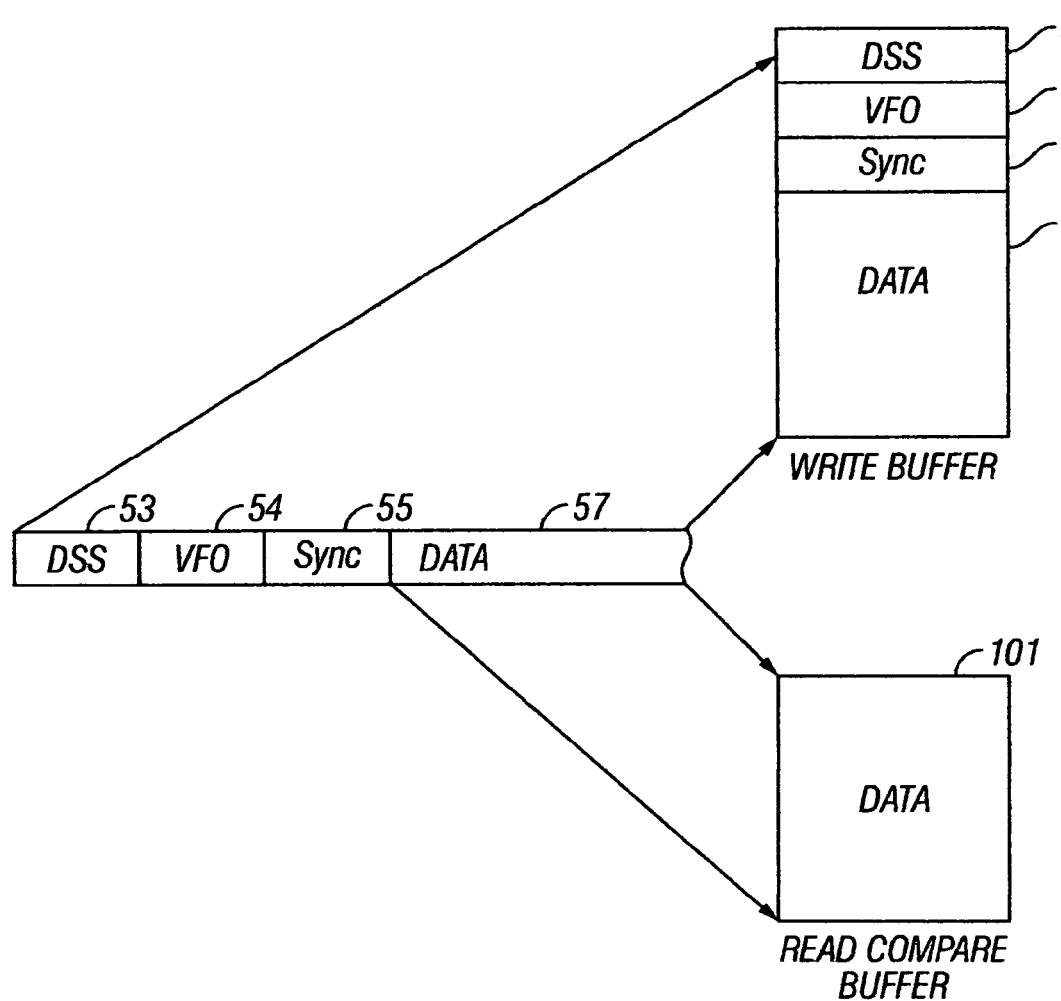
FIG. 4 is a diagrammatic illustration of record formatting and write and read data partitioning by the magnetic tape drive of FIG. 2.

Referring to FIGS. 1, 3 and 4, write logic 46 may be configured to add format information to the testing data. An example of format information conforming to the LTO format, above, is illustrated in FIG. 4, comprising a Data Separator Signal (DSS) pattern 53, a Variable Frequency Oscillator (VFO) pattern 54, and a Synchronization (Sync) pattern 55. The patterns separate data records represented by data 57. As one example, the format information is provided by error control system 12, via controller 18, to the write buffer 40 of FIG. 3 to be written to the magnetic tape. Alternatively, the format information is stored by controller 18, and added by the controller 18 as data 49. The format information is accompanied by the testing data 57 for each of the separate tracks.

Figure 5:
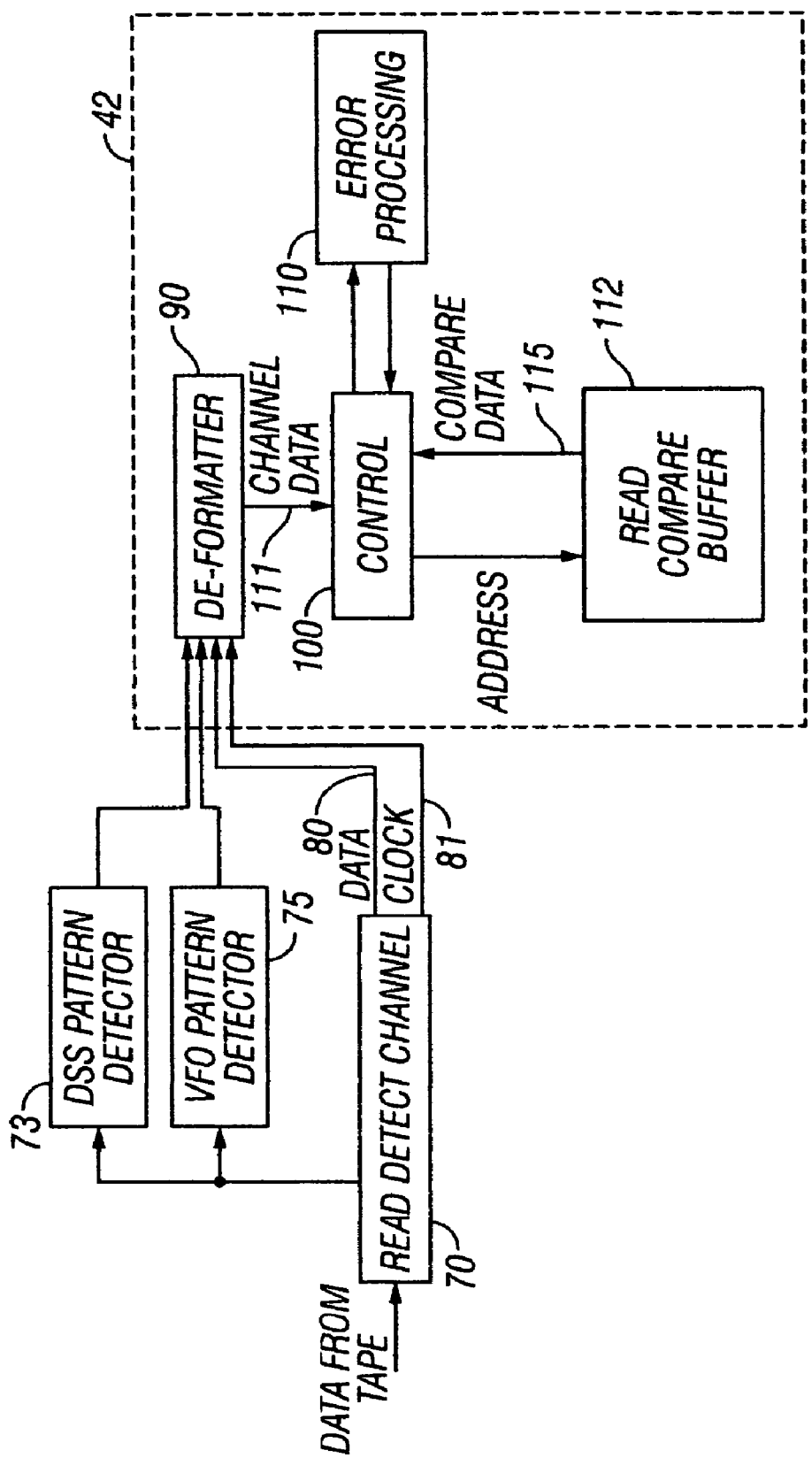
FIG. 5 is a block diagram of integrated read reliability testing apparatus of the magnetic tape drive of FIG. 2.

Referring to FIGS. 1 and 5, read channel logic 60 comprises a plurality of read channels, each configured to read data sensed by a tape read head 61 from a separate track of a magnetic tape 14. Read heads 61 comprise the read heads of write and read heads 23 of FIG. 2. The resultant data is provided to the read compare logic 42 comprising error processing logic configured to detect differences between data from each of the plurality of read channels, and stored testing data of the memory representing data written to the same separate tracks.

Referring to FIGS. 1 and 5, in one embodiment, data from a read head is provided to a read detect channel 70 of the read channel logic 60. The read channel logic may also comprise a DSS pattern detector 73 and a VFO pattern detector 75. In the example of FIG. 5, both data 80 and clock information 81 are derived by the read detect channel 70, and provided to read compare logic 42 of FIGS. 1 and 5. Thus, if format information has been written with the data to the separate track detected by the read detect channel 70, that format information is detected by the detectors 73 and 75.

Referring to FIGS. 1 and 5, a de-formatter 90 strips the format information detected by DSS pattern detector 73 and VFO pattern detector 75 from the data 80.

A control 100 organizes the data for comparison to allow detection of the differences between data from each of a plurality of the read channels, and stored testing data of the memory representing data written to the same separate tracks.

Figure 6:
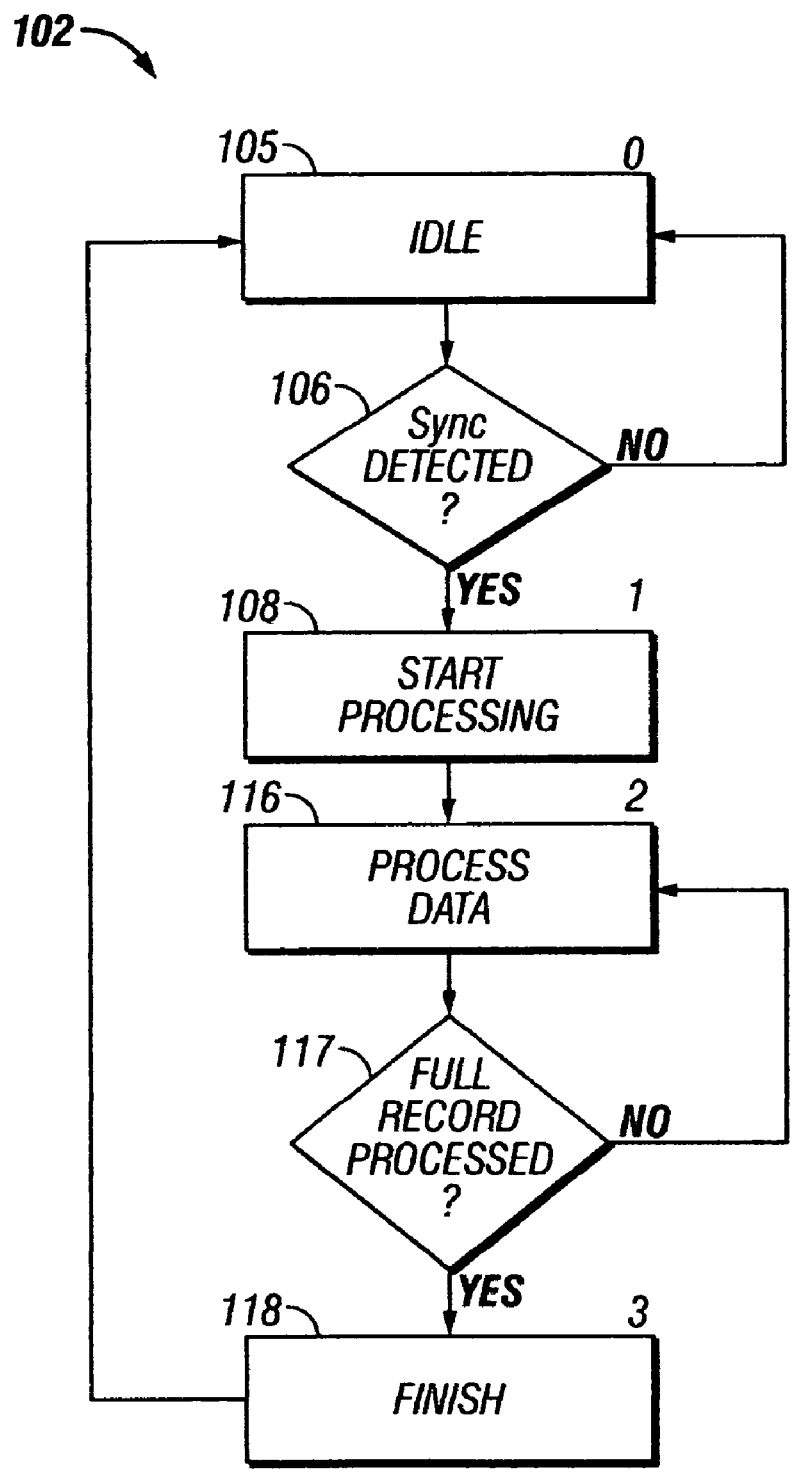
FIG. 6 is a diagrammatic illustration of a control state machine of the read reliability testing apparatus of FIG. 5.

Referring to FIGS. 5 and 6, in one embodiment, the control 100 may comprise a state machine 102 which detects the Sync pattern 55 of FIG. 4, which pattern indicates the beginning of a data record, represented by data record 101. The data record 101 may have no relationship to a normal data record and represents the test data for a separate track, whereas a normal data record may be represented by the combined data from a group of tracks.

Referring to FIGS. 5 and 6, the first state "0" of the state machine is an idle state 105, cycling to detect 106 the Sync pattern. Upon detection of the Sync pattern, the state machine moves to state "1" to start processing the data 108 at error processing logic 110. The control passes channel data 111 read from the separate track of the magnetic tape to the error processing logic, and addresses corresponding stored testing data from memory 112. Memory 112 is configured to store testing data received from controller 18 of FIG. 1. The stored testing data of the memory 112 represents data written to the same separate track. As discussed above, the testing data may comprise a unique pattern for each track, or, alternatively, the same patterns may be used for some or all of the tracks.

Control 100 provides the data 111 read from the separate track and the corresponding stored testing data 115 to the error processing logic 110 for comparison.

Still referring to FIGS. 5 and 6, the state machine is in state "2" 116 to process the data. When a full record has been processed 117, the state machine enters state "3" 118, and the state machine cycles back to state "0" to detect the next Sync 105, 106.

Figure 7:
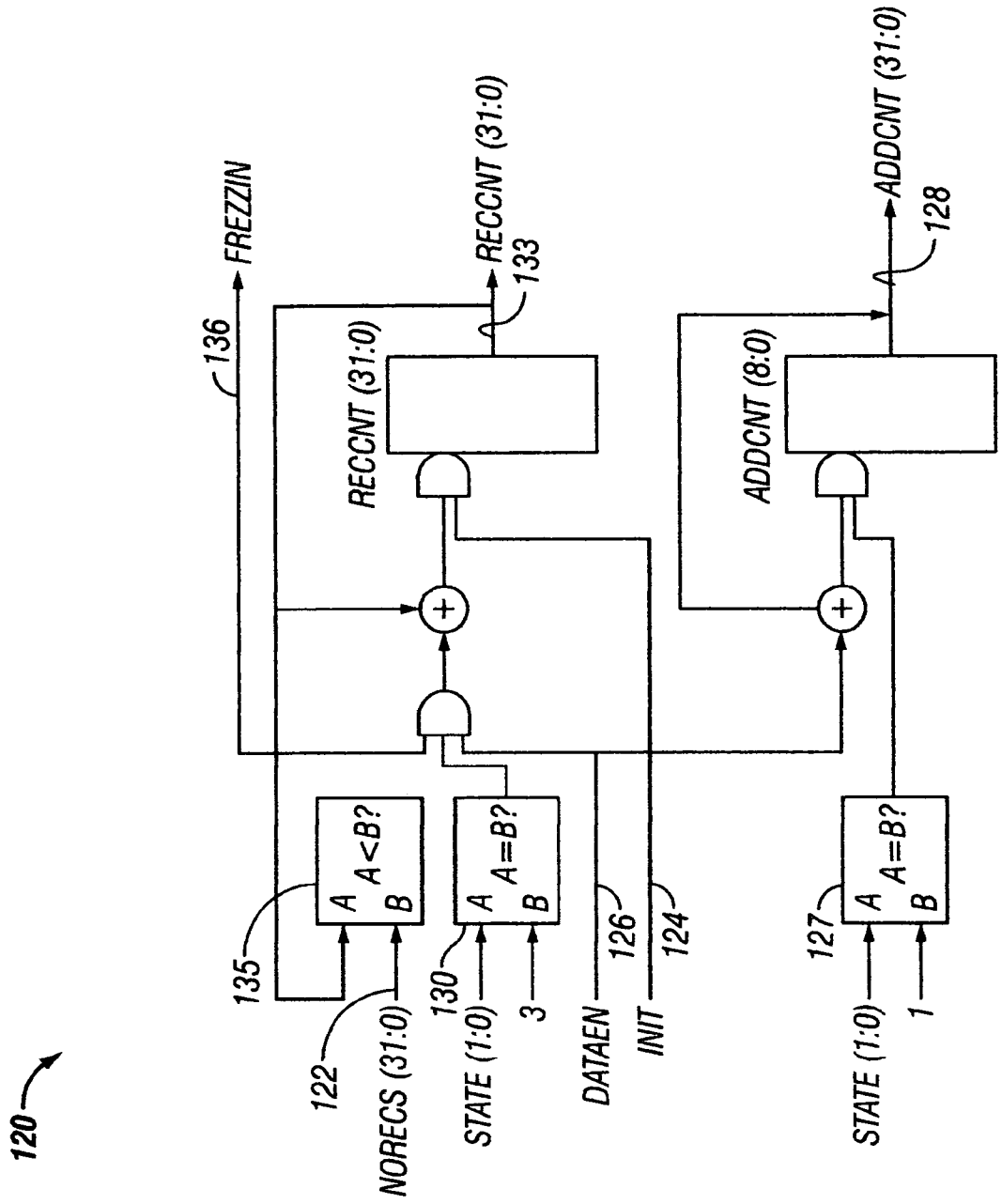
FIG. 7 is a block diagram of a record counter to control the comparison of data of the read reliability testing apparatus of FIG. 5.

Referring to FIGS. 5, 6 and 7, the state machine 102 of control 100 drives a record and buffer address counter 120 to synchronize the memory 112 with the read data input, and to identify the total amount of data to be compared. The number of records to be compared may be programmed and supplied at input 122 (no. of records—NORECS), for example, by the processor 12 of FIG. 1, via controller 18.

Still referring to FIGS. 5, 6 and 7, the initialization of a test is signaled at input 124, and input 126 (data enable—DATAEN) indicates that valid data words are supplied from the de-formatter 90. When state machine 102 enters state "1" to start processing the data 108 at error processing logic 110, the state signal of "1" also operates element 127 to increment the addresses 128 of memory 112 to the next record to synchronize the memory 112 with the read data input. When the state machine 102 enters state "3", indicating the end of a record, element 130 increments the record count 133. The record count is fed back to element 135 and compared to the identification of number of records to be compared from input 122, and when the record count equals the value at input 122, element 135 activates line 136 to freeze the comparison of the data 111 read from the separate track and the corresponding stored testing data 115 by the error processing logic 110 at that point.

Control 100 may optionally take other forms, such as direct logic or firmware, and not all of the functions are required. As an example, the comparison of the data 111 read from the separate track and the corresponding stored testing data 115 by the error processing logic 110 may end when the comparison data of memory 112 is drained.

Referring to FIGS. 1 and 5, error processing logic 110 is configured to detect differences between data from a read channel, and stored testing data of the memory 112, the stored testing data representing data of the same separate track as read by the corresponding read channel.

Alternatively, the read compare logic 42 may be configured to handle a plurality of read channels in parallel. In this case error processing logic 110 detects the differences between data from each of a plurality of read channels, and stored testing data of the memory 112 representing data written to the same separate tracks.

As a part of detecting the differences, error processing logic 110 may count the differences detected for each track. Further, the number of differences may be compared to the number of records for each track to provide an error rate indication. Those of skill in the art can envision additional measurements regarding the detected differences. The detected differences are provided together with an identification of the track, or each track, corresponding to the provided detected differences.

The results provided by error processing logic 110 are provided to the error control system 12 for further analysis.

Figure 8:
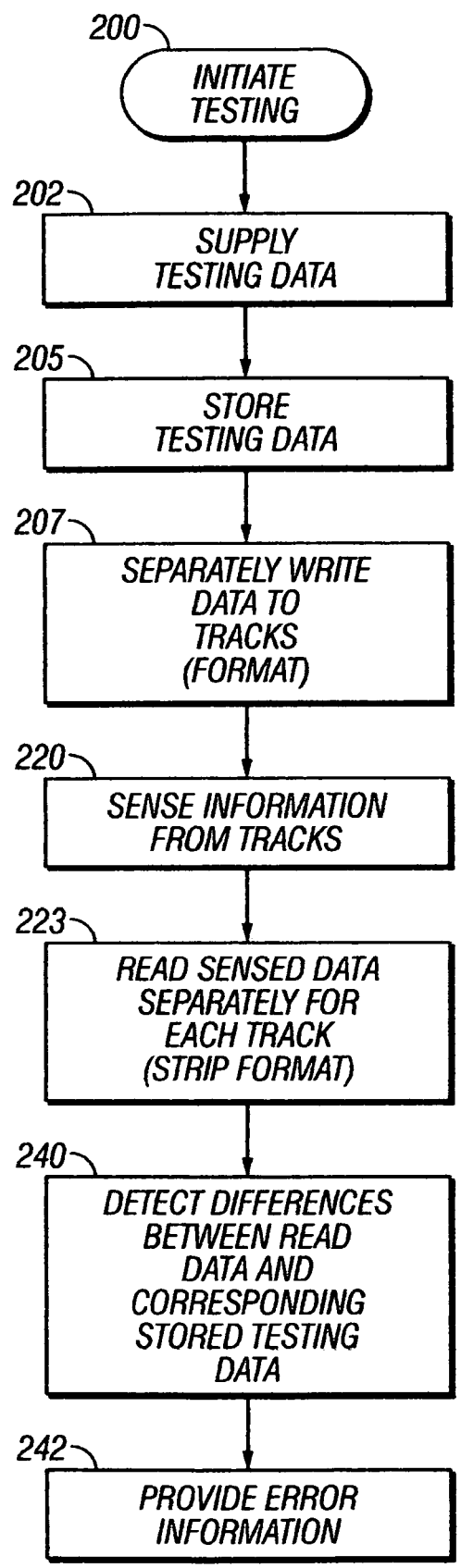
FIG. 8 is a flow chart depicting an embodiment of a method in accordance with the present invention.

FIG. 8 depicts an embodiment of a method in accordance with the present invention, beginning at step 200, for example, by an external processor or internal controller. In step 202, the testing data is supplied by an external processor at initialization or has been preloaded. The testing data comprises a pattern load, and is unique for each track to be recorded. Alternatively, the same patterns may be used for some or all of the tracks. For example, pairs of tracks in a group may have the same pattern recorded by the write heads. In step 205, the testing data is stored, for example in a buffer. In step 207, the testing data is separately written to each of the tracks of a group of tracks of a multi-track magnetic tape, as discussed above. The data may also be formatted when written.

In step 220, read heads sense the information from the tracks, and in step 223, the sensed data is read from the separate tracks of a magnetic tape. Any formatting may also be stripped from the data in step 223.

Step 240 detects differences between the data read from the separate tracks of the magnetic tape of step 223 and the stored testing data of step 205, where the stored data represents data of the corresponding separate tracks as read in step 223.

In step 242, error information is provided representing the results of the differences detected in step 240.

Those of skill in the art will understand that changes may be made with respect to components illustrated herein. Further, those of skill in the art will understand that differing specific component arrangements may be employed than those illustrated herein. Still further, those of skill in the art will understand that changes may be made with respect to the steps of the method illustrated herein and that steps may be combined or individual steps may be separated into multiple steps.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. Apparatus configured for data reliability testing for a magnetic tape drive configured for parallel recording of data to multiple tracks, comprising:

a plurality of write channels, each configured to supply separate testing data comprising a unique pattern to each track of a multiple track parallel tape head for separately writing said separate and unique testing data to each track of a group of parallel data tracks of a multiple track magnetic tape, and for writing a Synch pattern with said testing data representing the beginning of a data record;

memory configured to store data representing said separate testing data comprising said unique patterns separately written to each said parallel track of said group of parallel data tracks;

a plurality of read channels, each configured to read data sensed by a tape head from a parallel track to which said separate test data was written, said read data corresponding to said separately written test data for said parallel track;

a control state machine configured to respond to a detection of said Synch pattern by at least one of said plurality of read channels, to pass said corresponding data read from each of said tracks to said error processing logic and to drive a record and address count to synchronize said memory with said corresponding read data of each parallel track of said group of parallel tracks;

wherein said error processing logic configured to separately compare and detect differences between said stored separate testing data comprising said unique patterns of said memory for each of said parallel tracks, and said corresponding data read from said track of said group of parallel data tracks.

2. A method for testing the data reliability of a magnetic tape drive configured for parallel recording of data to multiple tracks, comprising the steps of:

writing separate testing data, by a plurality of write channels of a multiple track parallel tape head, comprising a unique pattern to each track of a group of parallel data tracks of a multiple track magnetic tape, and writing a Synch pattern with said testing data representing the beginning of a data record;

storing data in a memory, representing said separate testing data comprising said unique patterns separately written to each said parallel track of said group of parallel data tracks;

reading data from each track of said group of parallel tracks to which said separate test data was written, by a plurality of read channels of a multiple track parallel tape head, said read data corresponding to said separately written test data for said parallel track;

in response to a detection of said Synch pattern by at least one of said plurality of read channels, stepping a state machine to pass said corresponding data read from each of said tracks to an error processing logic and driving a record and address count to synchronize said memory with said corresponding read data of each said parallel track; and wherein said error processing logic separately detects differences between said stored separate testing data comprising said unique patterns of said storing step for each of said parallel tracks, and said corresponding data read from said track of said group of parallel data tracks in said reading step.

* * * * *